United States Patent [19]

Moran

[11] Patent Number: 4,949,452

[45] Date of Patent: * Aug. 21, 1990

[54] METHOD FOR MAKING SEARCH COIL ASSEMBLY FOR METAL DETECTORS

[75] Inventor: James M. Moran, Leominster, Mass.

[73] Assignee: Barkley & Dexter Laboratories, Inc., Fitchburg, Mass.

[*] Notice: The portion of the term of this patent subsequent to May 30, 2006 has been disclaimed.

[21] Appl. No.: 431,880

[22] Filed: Nov. 6, 1989

Related U.S. Application Data

[60] Division of Ser. No. 357,781, May 30, 1989, Pat. No. 4,903,395, which is a continuation-in-part of Ser. No. 56,241, Jun. 1, 1987, Pat. No. 4,833,773.

[51] Int. Cl.$^5$ .............................................. H01F 7/06
[52] U.S. Cl. .................................. 29/602.1; 336/84 C; 336/96; 264/272.19; 264/46.5
[58] Field of Search ............................. 29/602.1, 605; 336/84 C, 84 R, 96; 264/272.19, 46.5, 46.9; 427/104; 324/228, 238-243

[56] References Cited

U.S. PATENT DOCUMENTS

| | | | |
|---|---|---|---|
| 2,237,254 | 4/1941 | Broekhuysen | 208/81 |
| 2,628,342 | 2/1953 | Taylor | 336/45 |
| 2,705,292 | 3/1955 | Wagenseil | 310/196 |
| 3,213,173 | 10/1965 | Cobb | 264/272.19 |
| 3,278,455 | 10/1966 | Feather | 29/602.1 |
| 3,361,962 | 1/1968 | Albrecht | 324/41 |
| 3,368,175 | 2/1968 | Giegerich et al. | 336/84 C |
| 4,173,822 | 11/1979 | Fütterer et al. | 264/272.19 |
| 4,179,796 | 12/1979 | Allen | 264/272.19 |
| 4,683,454 | 7/1987 | Vollmer et al. | 335/299 |

FOREIGN PATENT DOCUMENTS 96568 12/1983 European Pat. Off. .
2146128 4/1985 United Kingdom .

Primary Examiner—P. W. Echols
Attorney, Agent, or Firm—Scott R. Foster

[57] ABSTRACT

A method for making a coil assembly for a metal detector of the type used for detecting metal fragments in foodstuffs and pharmaceuticals, the method comprising providing a frame of non-metallic material, the frame having an aperture therethrough for the passage of material undergoing inspection, winding coils of electrically conductive strands on the frame, applying a first plastic coating in liquid form to the frame and coils, less the aperture portion of the frame, applying metal in fluid form to the first plastic coating to encase the first plastic coating in a metal layer, and applying a second plastic coating in liquid form to the metal layer to encase the metal layer in a second plastic coating.

2 Claims, 4 Drawing Sheets

METHOD FOR MAKING SEARCH COIL ASSEMBLY FOR METAL DETECTORS

Cross Reference to Related Application

This is a division of application Ser. No. 07/357,781, filed May 30, 1989, now U.S. Pat. No. 4,903,395, which is a continuation-in-part of application Ser. No. 07/056,241, filed June 1, 1987 in the name of James M. Moran, and issued May 30, 1989 as U.S. Pat. No. 4,833,773.

BACKGROUND OF THE INVENTION

1. Field of the Invention

This invention relates to metal detectors of the type used to detect metal fragments in foodstuffs and pharmaceuticals, and is directed more particularly to an improved method for making search coil assemblies for such detectors.

2. Description of the Prior Art

In many industries, such as food processing, non-metallic materials, such as foodstuffs, are conveyed automatically to various processing machines and stations. A problem arises when tramp metal is introduced into the material stream. Such tramp metal can constitute a hazard if sold to the public in foodstuffs and even in the processing area can constitute a hazard for some types of processing machinery.

It is known in the art that the non-metallic material can be passed through the electromagnetic field of a search coil, and that if tramp metal is present in the material stream such metal will disturb the elctromagnetic field of the search coil and induce a detectable error signal in the search coil. Responsive to the error signal, the material stream can be stopped, or diverted to a waste container, accompanied, if desired, by visual and audible alarm means.

The sensitivity of such search coil metal detector systems is related to the size of an aperture through which the non-metallic stream is directed and around which is disposed the search coil. The smaller the aperture, or passage hole, for the product under test, the smaller is the size of metallic particles that can be detected. It has, therefore, been common practice to select an aperture size which allows the product, and its conveying belt, to pass through the aperture with minimum clearance.

For example, if it were required to inspect a packaged food product whose outside dimensions were 4"×5"×10", with the 10" dimension occurring in the direction of travel, the aperture size chosen probably would be on the order of 5"×7". Since package or product size is a result of particular marketing and manufacturing requirements peculiar to each product at a given time, the resultant effect has been to require a very large number of different sizes and shapes of metal detectors to be maintained in inventory, or to require the extensive time delay in the making of a custom metal detection machine for a new sized product.

The size and shape requirements have resulted in a difficult manufacturer - end user relationship. The manufacturer must maintain a large number of different sizes, many of which may be inventoried for an uneconomical period of time. The alternative, as mentioned above, is to build to order. Because of the laborious manner in which the search coil assemblies are made, producing a particular size and/or shape to order is quite expensive and timeconsuming.

Because of the expense involved, it is customary that such detectors are used only at processing plants or distribution points. At times, metal is introduced into the product after the product leaves the processing plant and before sale to a consumer. Such is likely to be the case in occasions of "tampering".

The present state of the art in the manufacture of metal detector coil cases requires the production of a metal box to serve as a metallic shield around the electrical coils. When the correct size box is made, the conductive coils are wound on a non-metallic coil form and the form, or frame, with the coils wound thereon, is inserted into the metal box and suspended therein. The space between the coil and the box is then filled with non-metallic filler. The filler acts as a moisture sealant, as well as a retainer for reducing the relative motion between the metal case and the coil. Any relative motion between the coils and the surrounding metal case results in a spurious signal.

The above-described method requires, in ordinary practice, about ten to thirty weeks to produce a detector apparatus ready for commercial use, an obviously lengthy and very expensive method of production.

Accordingly, an object of the invention is to provide a method for making metal detection devices, and particularly the search coil assembly portion thereof, in a manner greatly reducing the time required to produce such components, so that metal detectors of various sizes may be produced quickly, without the need for maintaining large inventories.

A further object of the invention is to provide a method for making search coil assemblies for metal detection devices, the method providing such economic benefits as to render purchase and use of such devices at the retail level practicable from an economic standpoint.

SUMMARY OF THE INVENTION

With the above and other objects in view, as will hereinafter appear, a feature of the present invention is the provision of a method for making search coil assemblies for metal detectors, the method including the steps of providing a frame of non-metallic material, the frame having an aperture therethrough to facilitate passage therethrough of material undergoing inspection, winding coils of electrically conductive strands about the frame, applying plastic in liquid form to the frame and coils, less the aperture portion of the frame, allowing the plastic to cure, to embed the coils in a first plastic coating, applying metal in fluid form to the surface of the first plastic coating, permitting the metal to harden, to thereby encase the first plastic coating in a metal layer, and applying plastic in liquid form to the surface of the metal layer to encase the metal layer in a second coating of plastic.

The above and other features of the invention, including various novel details of construction and combinations of parts, will now be more particularly described with reference to the accompanying drawings and pointed out in the claims. It will be understood that the particular method embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENTS

Figure 1:
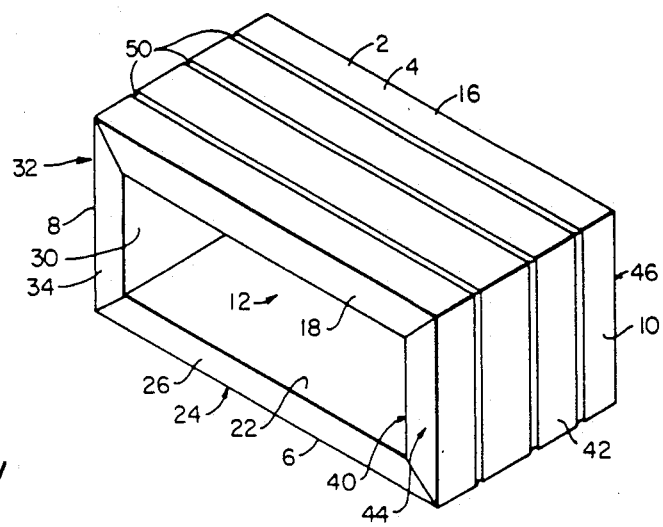
FIG. 1 is a perspective view of one form of frame provided in accordance with the invention.

Referring to the drawings, it will be seen that there is provided a frame 2 having a top member 4, a bottom member 6, and side members 8, 10, defining an aperture 12 therethrough. The frame is constructed of non-metallic material, such as plastic. The members 4, 6, 8, 10, are preferably glued together and/or joined together by dovetail interlock. The top frame member 4 has an internal surface 14, an external major surface 16, and end surfaces 18, 19. The bottom frame member 6 is similarly provided with an internal surface 22, an external major surface 24, and end surfaces 26, 28. The first frame side member 8 is provided with an internal surface 30, an external major surface 32, and end surfaces 34, 36. In like manner, the second frame side member 10 is provided with an internal surface 40, an external major surface 42, and end surfaces 44, 46.

In the embodiment shown in FIG. 1, each of the external major surfaces 16, 24, 32 and 42, is provided with three grooves 50, which are in alignment from frame member to frame member to provide continuous grooves around the exterior of the frame.

After completion of the frame 2, electrically conductive strands comprising wires 60, are wound upon the frame, the wires 60 being disposed in the grooves 50. Typically, the wires 60 are arranged in three groups, defining three coils, each coil made up of one or more wires. A "transmit" coil 62 is disposed centrally of the frame, and on either side thereof is disposed a "receive" coil 64, 66. Each of the coils 62, 64, 66 has two free ends, respectively, 62a, 62b, 64a, 64b, and 66a, 66b. The free ends 62a and 62b of the transmit coil lead away from the assembly, and the free ends 64a, 64b, 66a, and 66b of the receiving coils lead away from the assembly.

In an alternative embodiment (not shown) the electrically conductive strands comprise conductive tape which is applied to the form without the need of grooves, but otherwise in substantially the same arrangement as described above relative to the use of wires as conductive strands.

Figure 2:
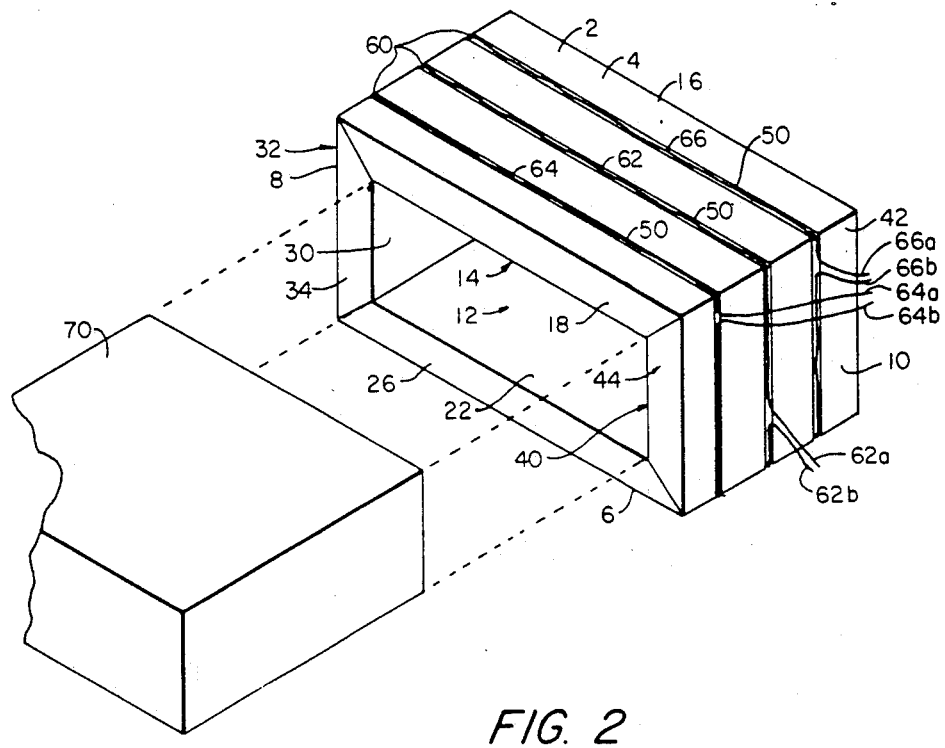
FIG. 2 is a perspective view, similar to FIG. 1, but showing the addition of coils to the frame.

In operation of the search coil assembly, it is imperative that there be no relative movement between the wires 60 (or tapes) and the frame 2. To insure that such movement does not occur, the wires 60 (less the free ends) are embedded in molten plastic. It is also important that no moisture reach the wires. The embedding of the wires in plastic further serves to keep the wires free from moisture. Before applying plastic to the assembly, the aperture 12 is filled by a block 70 which shields the frame internal surfaces 14, 22, 30 and 40 (FIG. 2) and supports the frame to prevent distortion thereof during the plastic application stage.

Figure 3:
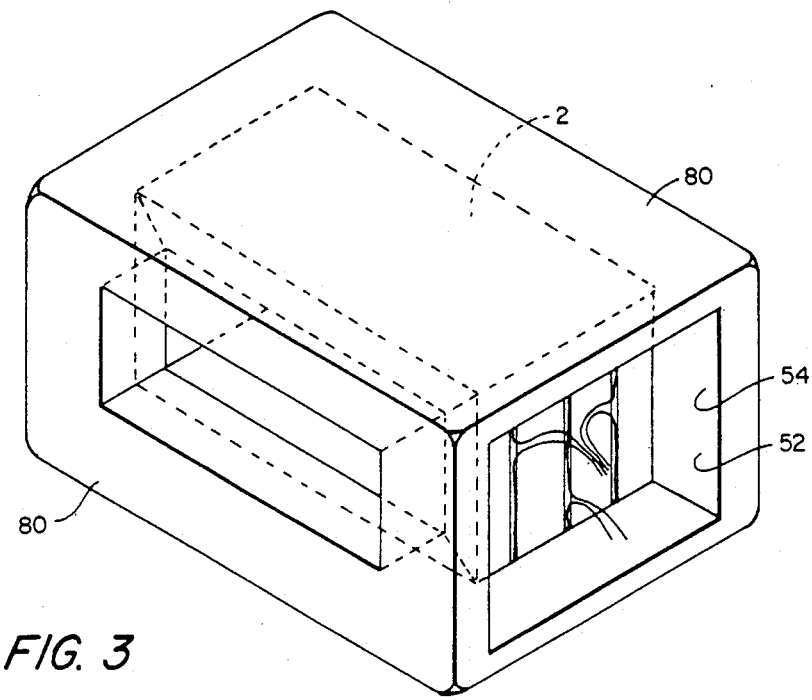
FIG. 3 is a perspective view, similar to FIG. 2, but showing the first coating of plastic applied to the frame and coils to imbed the coils in the plastic.

With the block 70 filling the aperture 12 and extending in both directions therefrom. The frame and wire assembly is covered with molten plastic as by spraying, dipping, or molding. The plastic may be an epoxy, a foam-in-place, or any such non-conductive plastic, or plastic-like matter as will readily adhere to the frame and wires. A polyurethane foam type plastic has been found to be advantageous. This material may be applied as a liquid which upon setting goes through an expansion process which fills all voids around the coils. The thickness of the plastic coating 80 should be such as to completely embed the wires and protect them from moisture. In addition, it is desirable to have the plastic coating thick enough to maintain the metal layer, still to be applied, a sufficient distance from the wires 60, it having been discovered that close proximity of the metal layer to the wires greatly diminishes the effectiveness of the assembly. A thickness of about one to six inches is generally deemed sufficient. After application, the plastic coating 80 is allowed to set up and harden (FIG. 3). A cavity 52 is preferably molded at this stage into one end of the assembly to form a compartment 54 for electronic circuitry.

Figure 4:
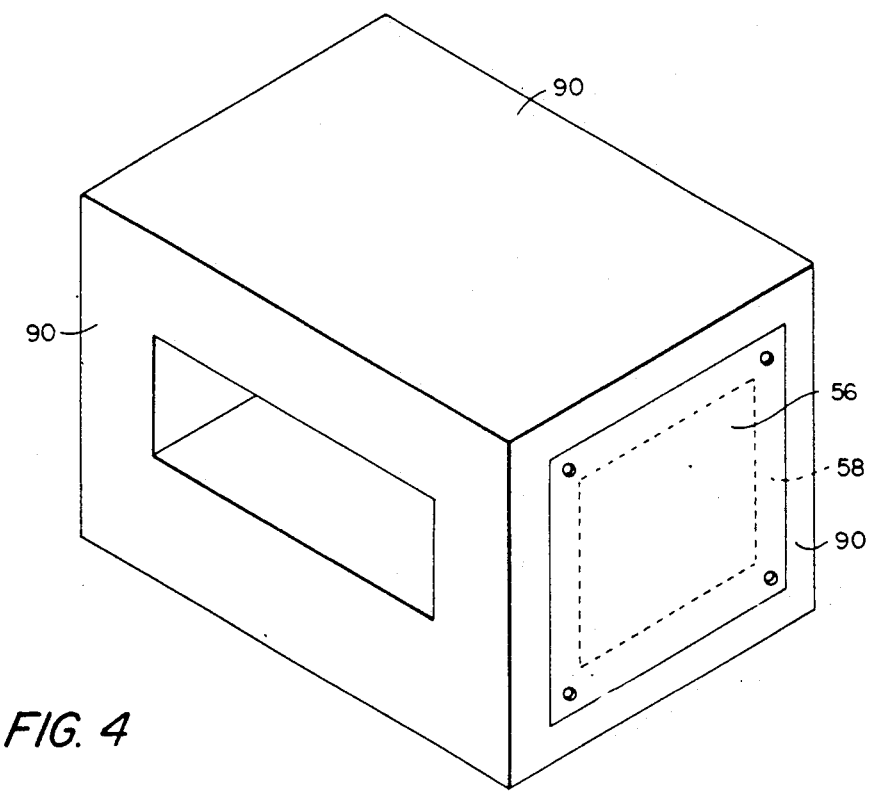
FIG. 4 is a perspective view, similar to FIG. 3, but showing the layer of metal applied to the first plastic coating surfaces to encase the first plastic coating in a layer of metal.

The present state of the art in the manufacture of metal detector coil systems requires that a metallic shield be placed around the electrical coils in all directions, except the inspection direction. Accordingly, to the plastic coated coil assembly of FIG. 3, there is added a layer of fluid metal, as by metallic painting, arcspraying, plating, vacuum depositing, and the like. The metal layer 90 completely covers the plastic 80 (FIG. 7), other than in the cavity 52, and adheres thereto. The metal preferably may be zinc, aluminum or stainless steel. The metal is allowed to set up and harden. A cover plate 56 may be used to cover the compartment 54 (FIG. 4). The cover plate 56 includes an inner surface of conductive material which is insulated by a suitable gasket 58, or the like, from the metallic layer 90. There may be used, for example, a metallic plate 56 with a rubber gasket 58, or a plastic plate 56 having the inner surface coated with conductive material, with the outer margins of the inner surface of the plastic plate left uncoated.

Figure 5:
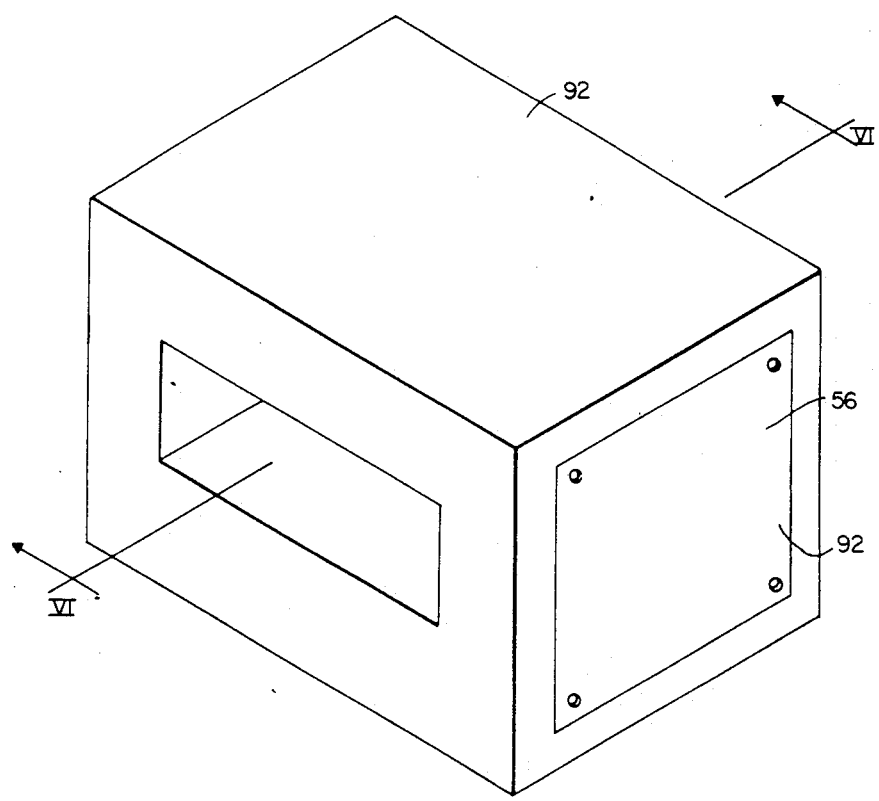
FIG. 5 is a perspective view, similar to FIG. 4, but showing the second coating of plastic applied to the metal surface to encase the metal layer in a coating of plastic.
Figure 6:
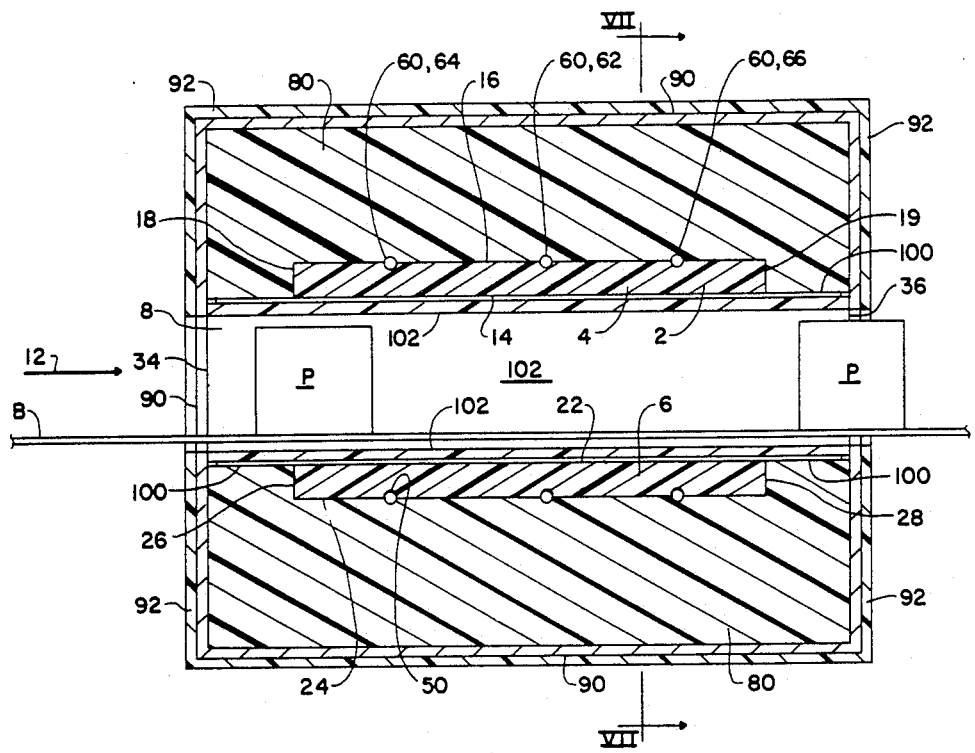
FIG. 6 is a sectional view, taken along line VI—VI of FIG. 5, and showing a conveyor belt and product thereon to be passed through the detector.

There is deposited onto the metal layer 90, as by spraying or dipping, an additional coating 92 of liquid plastic (FIG. 5). The metal layer 90, applied in fluid form, is substantially thinner (about 0.002 to 0.004 in. thickness) than the typical fabricated rigid metal boxes of the prior art (about 0.20 to 0.30 in. thickness) and is therefore more likely to experience performance difficulties if accidentally gouged or scraped during shipment, handling, or during its operational life. To avoid such inadvertently imposed damage to the metal layer 90, the metal layer is covered by the coating 92 of liquid plastic, which may be polyurethane resin, which is allowed to harden to form a second plastic coating of about 0.003 to 0.005 in. in thickness. The block 70 is then removed from the aperture 12. The cover plate 56 is similarly covered on its exterior surface with the plastic coating 92. Thus, the metal layer 90 is protected by the second plastic coating 92 from the perils of accidental bumps and scrapes (FIGS. 5 and 6).

Figure 7:
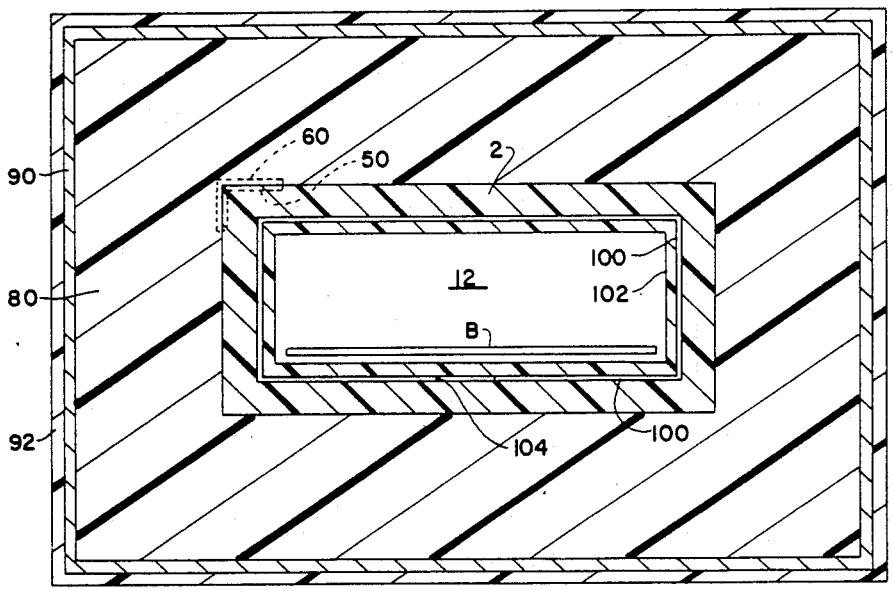
FIG. 7 is a sectional view, taken along line VII—VII of FIG. 6, and showing an alternative embodiment.

The exposed surfaces 14, 22, 30, 40, of the frame 2 are then sprayed or painted with a conductive material 100, such as a carbon suspension, which is of reduced conductivity and which creates an electrostatic shield. The purpose of this shield is to prevent false readings which might otherwise be occasioned by the passage of a conveyor belt through the coil assembly, as well as to minimize the spurious effects created while inspecting certain conductive products. The coating 100 is then protected by overcoating with a sprayed plastic similar to that previously described (92) or by the insertion of sheet plastic 102, as illustrated in FIGS. 6 and 7. The carbon coating 100 is insulated from the outer metal layer 90 and is grounded by a separate connection (not shown).

In an alternative and improved embodiment, shown in FIG. 7, an interruption in the coating 100 is provided, in the direction of product travel, in order to avoid the formation of a magnetically coupled loop with the main coil system 62, 64, 66. This can be readily accomplished by placing a piece of electrical insulating tape on one of the exposed surfaces of the frame 2, as for example, the surface 22, prior to application of the carbon coating, arranging the lengthwise direction of the tape to be colinear with the direction of product travel through the aperture 12. After the conductive coating 100 is applied, the tape is removed leaving an insulating gap 104 in the conductive coating 100 (FIG. 7). As described above, the coating 100 is then protected by overcoating with a sprayed plastic or by the insertion of the sheet plastic 102. The coating 100 in this embodiment, as in the above-described embodiment, is insulated from the outer metal layer 90 (FIG. 6) and is grounded by a separate connection (not shown).

The interrupted carbon coating appears to enhance the prevention of false readings which might otherwise be occasioned by the passage of the conveyor belt B through the coil assembly, as well as to further minimize the spurious effects created while inspecting certain electrically conductive products.

Upon completion of the above series of steps, there is provided a metal detector search coil unit, as shown in FIGS. 5 and 6, including the frame 2, coils of electrically conductive strands 60 wound on the frame, a first coating 80 of plastic adhering to and embedding the frame and wires, a layer 90 of metal adhering to and encasing the first plastic coating, and a second coating 92 of plastic adhering to and encasing the metal layer.

The search coil assembly is then connected to the remainder of a metal detector apparatus, including a conveyor belt B (FIG. 6) extending through the aperture 12 to convey package P through the aperture for inspection for metal particles, in accordance with known procedures, and the coil free ends connected to electronic circuitry disposed in the cavity 52 and/or external to the search coil assembly.

It is to be understood that the present invention is by no means limited to the particular construction herein disclosed and/or shown in the drawings, but also comprises any modifications or equivalents within the scope of the disclosure. For example, the aperture 12 may be of any shape required by a given product, such as rounded, square, rectangular, and the like.

Having thus described my invention, what I claim as new and desire to secure by Letters Patent of the United States is:

1. A method for making search coil assemblies for metal detectors, comprising providing a frame of nonmetallic material, said frame defining an aperture therethrough of a selected size for inspection of a selected product of a given size, winding coils of electrically conductive strands about said frame, shielding internal surfaces of said frame, applying a first plastic coating in liquid form to external surfaces of said frame and said coils to imbed said coils in said first plastic coating and to form a cavity in one end of the assembly, allowing said first plastic coating to cure, covering said cavity with a cover plate, applying metal in fluid form to the surface of the first plastic coating other than the internal plastic surfaces of said cavity, permitting the metal to harden, to thereby encase the first plastic coating in a metal layer, and applying a second plastic coating in liquid form to the surface of said metal layer to encase said metal layer in said second plastic coating.

2. The method for making search coil assemblies for metal detectors in accordance with claim 1, and including before the step of applying a first plastic coating in liquid form to the external surfaces of the frame and the coils, the disposition of free ends of the coils in the area of the cavity to be formed, such that upon completion of the first plastic coating step the coil free ends are disposed in said cavity.

* * * * *